United States Patent [19]

Claussen

[11] Patent Number: 4,466,070
[45] Date of Patent: Aug. 14, 1984

[54] CONTROL UNIT WITH DIGITAL ADDRESSING MEMORY FOR A DC-TO-AC INVERTER

[75] Inventor: Ulf Claussen, Wedel, Fed. Rep. of Germany

[73] Assignee: Siemens Aktiengesellschaft, Berlin and Munich, Fed. Rep. of Germany

[21] Appl. No.: 362,248

[22] Filed: Mar. 26, 1982

[30] Foreign Application Priority Data

Apr. 16, 1981 [DE] Fed. Rep. of Germany ....... 3115612

[51] Int. Cl.³ ...................... H02P 13/20; H02M 1/08
[52] U.S. Cl. ..................................... 364/480; 363/41;
363/42; 363/96; 363/136
[58] Field of Search ... 364/179, 483, 484, 900 MS File,
364/480; 363/27, 28, 40, 41, 42, 95, 96, 97, 98,
363/99, 135–139; 307/261; 328/150

[56] References Cited

U.S. PATENT DOCUMENTS 4,267,570 5/1981 Braun .................................. 364/480
4,290,108 9/1981 Woehrle et al. .................. 363/41 X
4,370,702 12/1983 Shuey et al. ........................... 363/42

Primary Examiner—Charles E. Atkinson
Assistant Examiner—Allen MacDonald
Attorney, Agent, or Firm—Kenyon & Kenyon

[57] ABSTRACT

A control unit for DC-to-AC inverter having an addressing memory which is loaded with an addressing table by a microprocessor for a respective frequency range of the inverter output voltage. In the addressing table, a predetermined portion of information is provided for each addressing combination of the switches of the DC-to-AC inverter, the portion of information containing the addressing combination itself and the number of clock pulses for which the addressing combination will be present. The portions of information are interrogated at different speeds depending upon the desired inverter output frequency. A frequency divider is addressed by a clock generator, the frequency divider receiving a division factor from the memory, the division factor being inversely proportional to the desired DC-to-AC inverter output frequency. The output signal of the divider decrements a counter which is loaded with a number of clock pulses associated with the respective addressing combination. Upon achieving a zero count, a new portion of information of the addressing table is provided at the output of the memory.

3 Claims, 4 Drawing Figures

CONTROL UNIT WITH DIGITAL ADDRESSING MEMORY FOR A DC-TO-AC INVERTER

BACKGROUND OF THE INVENTION

This invention relates generally to control units for DC-to AC inverters, and more particularly, to a DC-to-AC inverter control unit having a digital addressing memory which contains addressing tables for controlling the electrical switching elements of the DC-to AC inverter as a function of a predetermined amplitude of the DC-to AC inverter output voltage. For each combination of switching elements to be addressed, an addressing table is provided which contains information pertaining to the addressing combination and time information; the periodic scanning of the memory being controlled by a variable frequency oscillator which is connected to a counter.

In a known control unit for a DC-to AC inverter, the control unit is provided with an addressing table which contains the addressing combination and the time information. This known structure further contains an oscillator having a variable frequency output which is connected to the counting input of a counter which controls the periodic scanning of the memory. In this known control unit, one oscillation period of the inverter output voltage is divided into M equal angular steps which are numbered; the counter reading coinciding with the number of the respective angular step. The addressing memory has stored therein in fixed form the numbers of the angular steps at which an inverter valve should be fired or extinguished. An address counter precedes the addressing memory; the information in the memory cells which are addressed by the address counter being conducted to the memory output. The outputs of the counter and the addressing memory are conducted to a comparator which passes a command to the electrical switching elements if the signals at the outputs of the counter and the addressing memory coincide. If such a command is issued, the address counter is advanced simultaneously. The addressing memory contains a plurality of addressing tables, each of which corresponds to a different amplitude of the DC-to AC inverter output voltage. The frequency of the DC-to AC inverter output voltage is given by the oscillator frequency since the predetermined cycle of the addressing is traversed at different speeds which correspond to the oscillator frequency.

In the known control unit, known interrelationships between an input variable, such as voltage amplitude, and an output variable, such as the firing angle or a switching element, can be calculated in advance and stored in the addressing memory in the form of a list. The addressing can also be determined externally using elaborate optimizing methods.

It is a disadvantage of the known control unit, however, that the subdivision into angular steps and the addressing cycle itself are stored permanently in the addressing memory and can therefore not be changed. The resolution provided by the angular steps cannot be chosen to be arbitrarily high, in consideration of the allowable switching frequency of the inverter switching element at high operating frequencies. On the other hand, the fixed size of the steps provides low resolution and is too coarse at low frequency, thereby resulting in a poor approximation of the sinusoidal form. At higher frequencies, it is desirable, such as during motor operation, to convert from the sinusoidal form of the inverter output voltage, to a rectangular form. Such a conversion is not possible with the known arrangement because of the fixed storage of the addressing tables.

It is, therefore, an object of the present invention to develop a control unit of the type mentioned hereinabove wherein the switching frequency within a period, as well as the wave shape of the DC-to-AC inverter output voltage, are variable.

SUMMARY OF THE INVENTION

The foregoing and other objects are achieved by this invention which provides an addressing memory which is loaded by a microprocessor having different addressing tables as a function of a predetermined frequency range and of a predetermined amplitude of the inverter output voltage. The variable frequency oscillator is formed of a clock generator having a frequency divider connected thereto, the division factor of which is controlled by the set frequency value of the inverter output voltage so as to be a value which is inversely proportional to the desired frequency value. The output of the frequency divider is connected to a counting input of a counter, a presetting input of the counter being connected to the memory locations of the addressing memory which contains the time information. The time information contains the number of clock pulses at the output of the frequency divider for which the assigned addressing combination is to be present. The output of the counter is connected to a controller for the addressing memory, which advances the next column of the addressing table to the memory outputs.

In the inventive arrangement, the addressing memory is loaded for different ranges of output frequencies with different addressing tables so that a suitable switching frequency and wave form of the inverter output voltage can be selected for each frequency range. Since the addressing memory contains only one addressing table, the number of memory locations required is relatively small. The largest portion of the necessary data can be stored in memory associated with the microprocessor, and the total number of such memory locations can be reduced because the microprocessor itself can perform an intelligent evaluation of this memory. Thus, for example, symmetries or proportionalities of the addressing cycles for different frequencies or amplitudes of the DC-to-AC inverter output voltage can be used for reducing the stored data. The addressing memory can be of the advantageous intermediate memory type having "first in - first out" structure which accepts at least a number of columns of an addressing table corresponding to the number of phases of the inverter. The remaining columns of this addressing table and the other addressing tables are stored in a memory of the microprocessor. The intermediate memory delivers a signal to the microprocessor if the memory locations thereof are unoccupied. Upon receiving this signal, the microprocessor loads the intermediate memory with the next-following column of the addressing table.

In the DC-to AC arrangement, the changing of the switching states within a phase is limited by the maximum switching frequency of the inverter switching elements. However, the processing speed of commercially available microprocessors is generally not sufficient for such high speed switching. Switching processes in the different phases of the inverter can follow each other arbitrarily fast, and, in the inventive arrangement, such fast switching changes can be called from the addressing memory, the access time of which can be quite short. During this time, the microprocessor has enough time to load the addressing memory again. Thus, the speed of the switching changes is therefore not limited by the processing speed of the microprocessor.

In one embodiment, the division factor of the divider can be made smaller, during times when a low frequency output is desired from the inverter, thereby increasing the number of values in the addressing table. In this manner, the addressing table is scanned at a higher frequency so that the values which are required to address the DC-to AC inverter provides higher resolution. This prevents degradation of the sampling accuracy resulting from the increase in time duration at low frequencies.

BRIEF DESCRIPTION OF THE DRAWINGS

Comprehension of the invention is facilitated by reading the following detailed in conjunction with the annexed drawings, in which.

DETAILED DESCRIPTION

Figure 1:
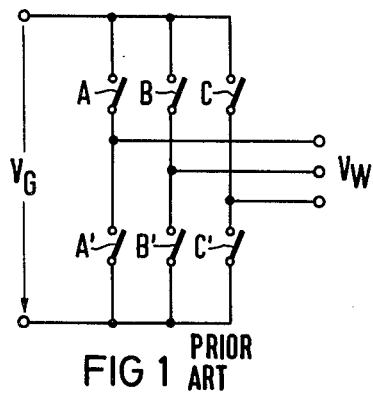
FIG. 1 is a schematic representation of a known DC-to AC inverter arrangement.
Figure 2:
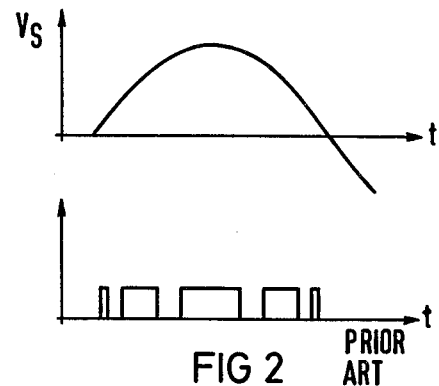
FIG. 2 has pulse and waveform diagrams which are useful for explaining the operation of the prior art arrangement of FIG. 1.

FIGS. 1 and 2 illustrate the known principle for addressing an inverter. FIG. 1 is a schematic representation of a prior art inverter having, illustratively, six switching elements, which may be thyristors or transistors A, B, and C, and A', B', and C', in a three-phase bridge circuit. The DC-to AC inverter converts a DC voltage $V_G$ at its input into a three-phase AC voltage $V_W$. In order to achieve a close approximation between AC voltage $V_W$ and a sinusoidal waveform, valves A to C, and A' to C' are addressed with pulse-width modulation. Thus, for low instantaneous values of a desired sine voltage $V_S$, narrow pulses are conducted to the corresponding switches, and wider pulses for higher instantaneous values. A voltage is then obtained which approximates the sinusoidal shape. The approximation to the sinusoidal shape is improved as the addressing pulses are morely finely divided. As noted, the required addressing pulses can be given in digital form, and the corresponding values thereof can be stored in a memory in tabular form. Such a table must contain information regarding every switching state during a period of the AC voltage $V_W$, as well as timing information. In known arrangements, the information is divided into columns, each column containing a binary signal combination which gives the switching state of the switches A to C and A' to C'. In the inventive control unit, each column further contains as the time information, the number of the clock pulses for which the respective addressing combination is to be present. The number of such columns per table is given by the required resolution, which number therefore determines the degree to which the output voltage approximates the desired sinusoidal waveform.

Figure 3:
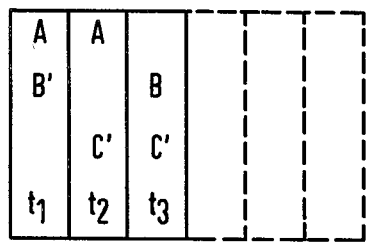
FIG. 3 is a representation of a digital tabulation of switching information in accordance with the present invention.

In FIG. 3, since the addressing pulse sequence for inverter switching elements A to C, and A' to C', is dependent upon the frequency, as well as the magnitude, of the output voltage $V_W$ of the DC-to AC inverter, a separate table would be required for each frequency and each voltage, thereby requiring many memory locations. However, by changing the scanning speed of the addressing table as a function of the desired frequency value of the DC-to-AC inverter output voltage, it is possible to provide only one addressing table for a frequency range of inverter output voltage.

Figure 4:
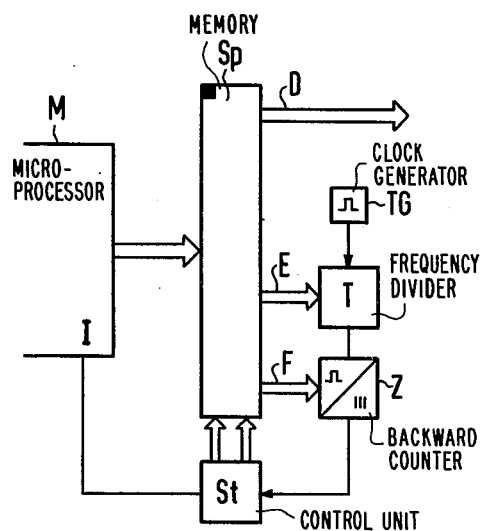
FIG. 4 is a function block diagram of an embodiment of the invention.

FIG. 4 shows an embodiment of a control unit constructed in accordance with the principles of the invention. A memory Sp is provided having an output D for providing the binary signal combinations required for addressing the switching elements of the DC-to-AC inverter. The memory is further provided with an output E which produces a division factor which will be explained hereinbelow. A further output F of the memory produces the number of the clock pulses t which is associated with a respective addressing signal combination.

A frequency divider T is controlled in response to the signals at output E of memory Sp. Frequency divider T receives at a further input a clock voltage generated by a clock generator TG. The clock frequency, which is divided in frequency divider T, is conducted to a counting input of a backward counter Z. A presetting input of the backward counter is connected to output F of memory Sp. Upon reaching a zero count, counter Z delivers via its output a signal to a control unit St which is associated with memory Sp. Control unit St is further connected to an interrupt input I of a microprocessor M.

FIG. 3 is a tabulation showing three columns of information relating to the three-phase inverter, whih information is loaded into memory Sp by microprocessor M. The table further contains a division factor which is inversely proportional to the desired value of the inverter output frequency. Counter Z, which is initially set to clock pulse number t, is decremented by the output pulses of frequency divider T. Upon receiving a zero value count, counter Z commands control unit St to shift the next following column of the addressing table to the outputs of memory Sp. Control unit St then reports to the microprocessor, via the intercept input, that memory Sp is no longer completely loaded. This initiates a subprogram within microprocessor M which fills memory Sp with a new column of the table. Since memory Sp has a "first in - first out" structure, all columns of the addressing table are thus switched successively to outputs D to F of memory Sp.

As noted hereinabove, the clock frequency is divided by frequency divider T by a value which is inversely proportional to the output frequency of the DC-to-AC inverter. This causes the frequency of the pulse sequence present at the counter input to increase as the present value of the inverter output frequency is increased. Thus, the table which is supplied by microprocessor M is used to control the inverter, only one addressing table being necessary for a frequency range. Different tables for different frequency ranges are required if the address pulse sequence is given at a frequency which can no longer be obtained purely by time stretching of the pulse sequence. In the case of drives, it is advisable in the high speed and high load range of the inverter to deviate from the sinusoidal waveform at the output of the inverter, and form an approximately rectangular output voltage. This is achieved by a separate addressing table for the high frequency range of the DC-to AC inverter output voltage.

For very low output frequencies of the DC-to-AC inverter, the timing of the addressing signal combinations which is sufficient during high frequency operation can be too coarse as a result of the time expansion. In such a case, the proportional factor between the desired value of the inverter output frequency and the division factor is changed so that, for example, the counting pulse frequency is doubled. Accordingly, the addressing table intended for the respective frequency range must have twice as many columns so that a sufficiently fine resolution of addressing combinations is available for low frequency operation of the inverter. The transition to different addressing tables is a function of the frequency range of the output voltage of the inverter and is achieved without difficulty by loading the addressing memory with a microprocessor.

In the inventive control unit, microprocessor M must be available only after an interrupt signal and for the duration of the subprogram loading of memory Sp. Upon completion of the loading, the microprocessor can continue the interrupted original task until an interrupt signal is again released via the control unit St upon the zero count of counter Z.

As a result of the intermediate storage of several columns of the addressing table in memory Sp outside of the microprocessor, the values can be retrieved from memory Sp very quickly, while the processing speed of the microprocessor can be relatively slow. Although the processing speed of the microprocessor must be matched to the average frequency of change of the binary output information, it is nevertheless limited by the permissible switching frequency of the switching elements in the inverter. Nevertheless, switching changes which relate to the different phases of the DC-to-AC inverter may follow each other at an arbitrary rate. The use of a memory, such as memory Sp, meets the requirements of fast retrieval while the microprocessor has sufficient time to replenish the values missing in memory Sp. In a three-phase embodiment of the invention, illustratively three columns of the addressing table are stored in memory Sp, since maximally three changes can follow each other at short intervals.

Although the invention has been described in terms of specific embodiments for specific applications, persons skilled in the art, in light of this teaching, can generate additional embodiments without departing from the spirit or exceeding the scope of the claimed invention. Accordingly, it is to be understood that the drawings and descriptions in this disclosure are proffered to facilitate comprehension of the invention, and should not be construed to limit the scope thereof.

What is claimed is:

1. A control unit for a DC-to-AC inverter, the control unit being of the type having a memory for containing addressing tables for the values of the DC-to-AC inverter, the addressing tables each corresponding to a predetermined amplitude of the output voltage of the DC-to-AC inverter, each addressing table having portions of information corresponding to respective addressing combinations and timing information, the control unit further having a variable frequency oscillator connected to a counter for controlling periodic scanning of the memory, the control unit further comprising:

microprocessor means for loading a variety of addressing tables into the memory, the addressing tables corresponding to predetermined ranges of frequency and amplitude of the output voltage of the inverter;

clock generator means contained in the variable frequency oscillator for producing a clock signal;

frequency divider means connected to said clock generator means and having an input terminal for receiving a division factor value from the memory, said division factor corresponding to a predetermined frequency of the output voltage of the inverter, said division factor value being inversely proportional to said predetermined frequency.

counter means connected to an output of said frequency divider means and having a presetting input connected to the memory for receiving a presetting value, and time information, said time information corresponding to a number of clock pulses at said output of said frequency divider means for which an associated addressing combination is to be preset; and control means for addressing the memory in response to an output signal from said counter means.

2. The control unit of claim 1 wherein the memory is an intermediate memory which accepts a predetermined number of portions of information from an addressing table, said predetermined number of portions of information corresponding to the number of phases of the DC-to-AC inverter, the remaining portions of information from said addressing table being stored in said microprocessor means, said intermediate memory having an output connected to said microprocessor means for providing a vacancy signal which indicates that said intermediate memory has vacant memory locations, said microprocessor means loading a further portion of information from said addressing table in response to said vacancy signal.

3. The control unit of claims 1 or 2 wherein, for low values of said predetermined frequency to which said division factor value corresponds, said division factor value is reduced by increasing said presetting value, also the number of values in the addressing table is increased.

* * * * *